(12) United States Patent  (10) Patent No.: US 8,490,151 B2
Boldyrev et al.  (45) Date of Patent: Jul. 16, 2013

(54) METHOD AND APPARATUS FOR PERFORMING A MULTI-ROLE COMMUNICATION USING A MEMORY TAG

(75) Inventors: Sergey Boldyrev, Söderkulla (FI); Jari-Jukka Harald Kaaja, Järvenpää (FI); Jarmo Tapani Arponen, Espoo (FI); Ian Justin Oliver, Söderkulla (FI); Mika Juhani Mannermaa, Burlington, MA (US); Alex Wilbur, Burlington, MA (US); Charles Wegrzyn, West Newbury, MA (US); Mikko Sakari Haikonen, Espoo (FI); Antonio Guadagno, Tampere (FI)

(73) Assignee: Nokia Corporation, Espoo (FI)

( * ) Notice: Subject to any disclaimer, the term of this patent is extended or adjusted under 35 U.S.C. 154(b) by 267 days.

(21) Appl. No.: 12/824,111

(22) Filed: Jun. 25, 2010

(65) Prior Publication Data

US 2011/0321118 A1 Dec. 29, 2011

(51) Int. Cl.
*G06F 17/00* (2006.01)
*H04L 29/06* (2006.01)
*G06F 17/30* (2006.01)
*G06F 13/00* (2006.01)
*G06F 15/16* (2006.01)
*H04L 9/32* (2006.01)

(52) U.S. Cl.
USPC .................. 726/1; 726/2; 709/203; 709/217; 709/245; 711/128; 713/168; 340/572.1

(58) Field of Classification Search
USPC .................. 340/12.51, 13.26; 713/168–174, 713/182–186, 202; 709/225, 229; 726/2–8
See application file for complete search history.

(56) References Cited

U.S. PATENT DOCUMENTS

| | | | |
|---|---|---|---|
| 5,099,346 A | | 3/1992 | Lee et al. |
| 6,204,765 B1 * | | 3/2001 | Brady et al. ............... 340/572.1 |
| 7,375,616 B2 | | 5/2008 | Rowse et al. |
| 7,668,794 B2 | | 2/2010 | Wang et al. |
| 2003/0137968 A1 | | 7/2003 | Lareau et al. |
| 2004/0212480 A1 | | 10/2004 | Carrender et al. |
| 2006/0238303 A1 | | 10/2006 | Loving |
| 2007/0011269 A1 * | | 1/2007 | Jeon et al. ..................... 709/217 |
| 2007/0155328 A1 | | 7/2007 | Turner |
| 2008/0100442 A1 | | 5/2008 | Grunwald et al. |
| 2008/0155258 A1 * | | 6/2008 | Obereiner et al. ............ 713/168 |

(Continued)

OTHER PUBLICATIONS

U.S. Appl. No. 12/552,094, filed Sep. 1, 2009, Sergey Boldyrev et al.

(Continued)

*Primary Examiner* — Evans Desrosiers
(74) *Attorney, Agent, or Firm* — Ditthavong Mori & Steiner P.C.

(57) ABSTRACT

An approach is presented for performing a multi-role communication using a Radio Frequency (RF) memory tag. The control manager receives a content request, at a memory tag, from a first device according to a first access policy. Further, the control manager determines one or more sources of content data responsive to the content request. Then, the control manager provides access from the one or more sources to the memory tag according to a second access policy. The access facilitates transmission of the content data to the first device according to a third access policy.

21 Claims, 16 Drawing Sheets

U.S. PATENT DOCUMENTS

| | | |
|---|---|---|
| 2009/0002174 A1 | 1/2009 | Kukita et al. |
| 2010/0042846 A1* | 2/2010 | Trotter et al. .................. 713/182 |
| 2010/0064249 A1 | 3/2010 | Groetken |
| 2011/0113198 A1* | 5/2011 | Cheng et al. .................. 711/128 |

OTHER PUBLICATIONS

U.S. Appl. No. 12/621,844, filed Nov. 19, 2009, Sergey Boldyrev et al.

U.S. Appl. No. 12/696,873, filed Jan. 29, 2010, Sergey Boldyrev et al.

U.S. Appl. No. 12/790,367, filed May 28, 2010, Sergey Boldyrev et al.

U.S. Appl. No. 61/324,588, filed Apr. 15, 2010, Jarmo Tapani Arponen et al.

Provably secure grouping-proofs for RFID tags, Burmester et al. Accessed: Aug. 16, 2010, http://www.cs.fsu.edu/~burmeste/136.pdf, pp. 1-20.

International Search Report for corresponding PCT Application No. PCT/FI2011/050544, Oct. 5, 2011, pp. 1-5.

Written Opinion for corresponding PCT Application No. PCT/FI2011/050544, Oct. 5, 2011, pp. 1-9.

* cited by examiner

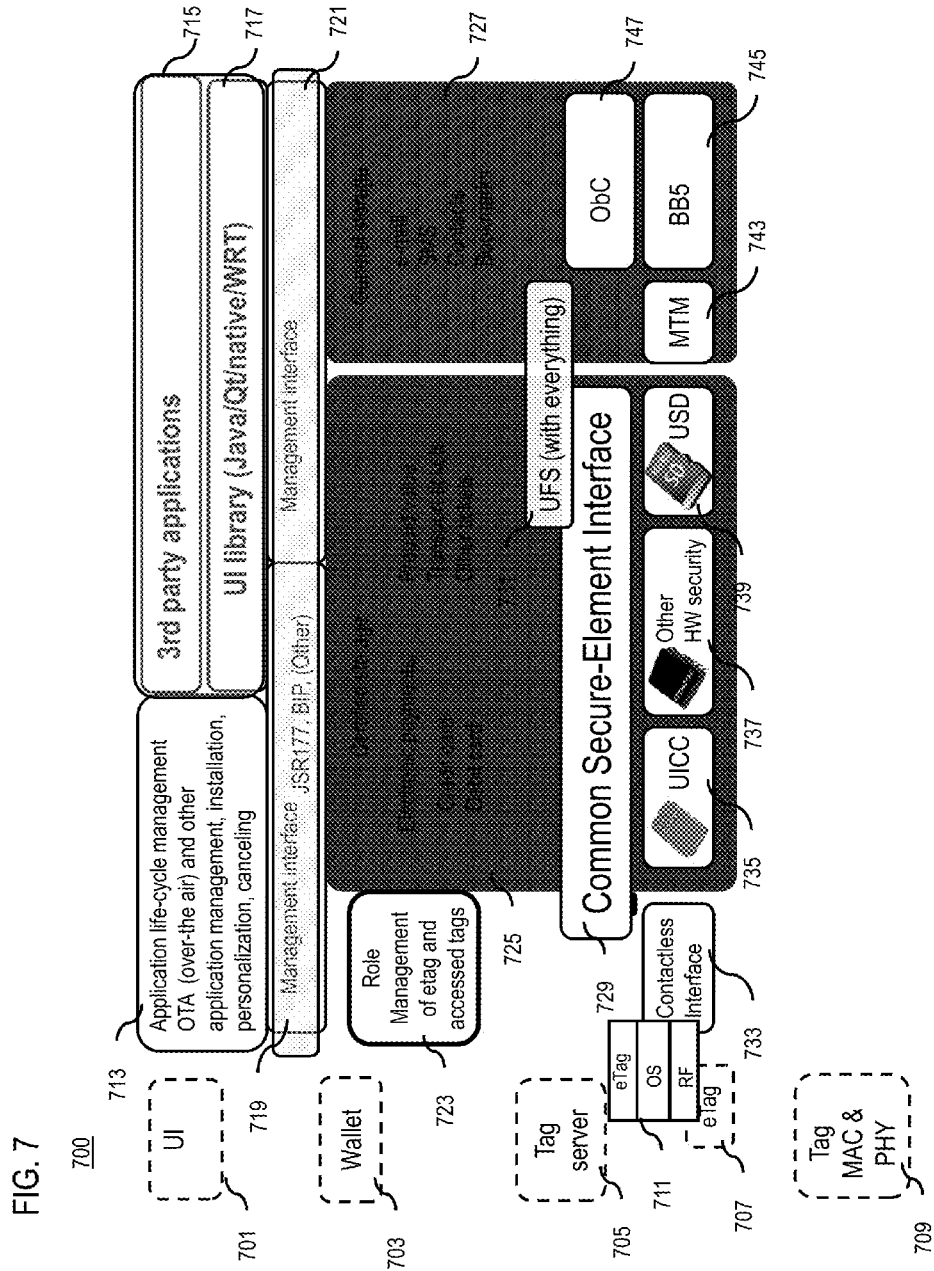

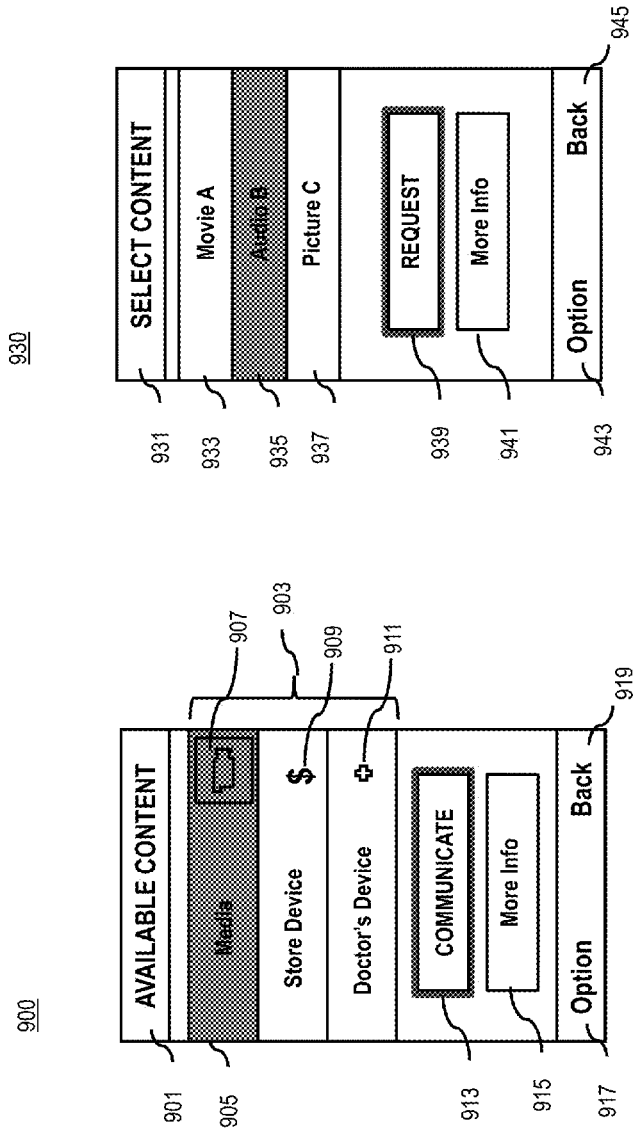

METHOD AND APPARATUS FOR PERFORMING A MULTI-ROLE COMMUNICATION USING A MEMORY TAG

BACKGROUND

Service providers and device manufacturers (e.g., wireless, cellular, etc.) are continually challenged to deliver value and convenience to consumers by, for example, providing compelling network services. One area of interest has been the development of innovative means for transferring information, conducting related transactions, and managing such tasks. At the same time, development has also progress in the use of memory tags (e.g., tags employing short range radio technology) for facilitating wireless information transfer, and exploring methods to utilize the various roles the memory tags. Accordingly, service providers and device manufacturers face significant challenges to enabling effective mechanisms for providing simultaneous and differentiated access to memory tags according to roles of the devices requesting such access.

SOME EXAMPLE EMBODIMENTS

Therefore, there is a need for an approach for performing a multi-role communication using a memory tag (e.g., a radio frequency (RF) memory tag).

According to one embodiment, a method comprises receiving a content request, at a memory tag, from a first device. The method also comprises determining one or more sources of content data responsive to the content request according to a first access policy. The method further comprises determining to provide access from the one or more sources to the memory tag according to a second access policy. The access facilitates transmission of the content data to the first device according to a third access policy.

According to another embodiment, an apparatus comprising at least one processor, and at least one memory including computer program code, the at least one memory and the computer program code configured to, with the at least one processor, cause, at least in part, the apparatus to receive a content request, at a memory tag, from a first device. The apparatus is also caused to determine one or more sources of content data responsive to the content request according to a first access policy. The apparatus is further caused to determine to provide access from the one or more sources to the memory tag according to a second access policy. The access facilitates transmission of the content data to the first device according to a third access policy.

According to another embodiment, a computer-readable storage medium carrying one or more sequences of one or more instructions which, when executed by one or more processors, cause, at least in part, an apparatus to receive a content request, at a memory tag, from a first device. The apparatus is also caused to determine one or more sources of content data responsive to the content request according to a first access policy. The apparatus is further caused to determine to provide access from the one or more sources to the memory tag according to a second access policy. The access facilitates transmission of the content data to the first device according to a third access policy.

According to another embodiment, an apparatus comprises means for receiving a content request, at a memory tag, from a first device. The apparatus also comprises means for determining one or more sources of content data responsive to the content request according to a first access policy. The apparatus further comprises means for determining to provide access from the one or more sources to the memory tag according to a second access policy. The access facilitates transmission of the content data to the first device according to a third access policy.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is an example diagram 700 showing various components of the UE 101 and their functionalities, according to one embodiment;

FIGS. 9A-9B are diagrams of user interfaces utilized in the processes of FIGS. 4 and 5 with respect to a user equipment, according to one embodiment;

DESCRIPTION OF SOME EMBODIMENTS

Examples of a method, apparatus, and computer program for performing a multi-role communication using a memory tag (e.g., a radio frequency (RF) memory tag) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
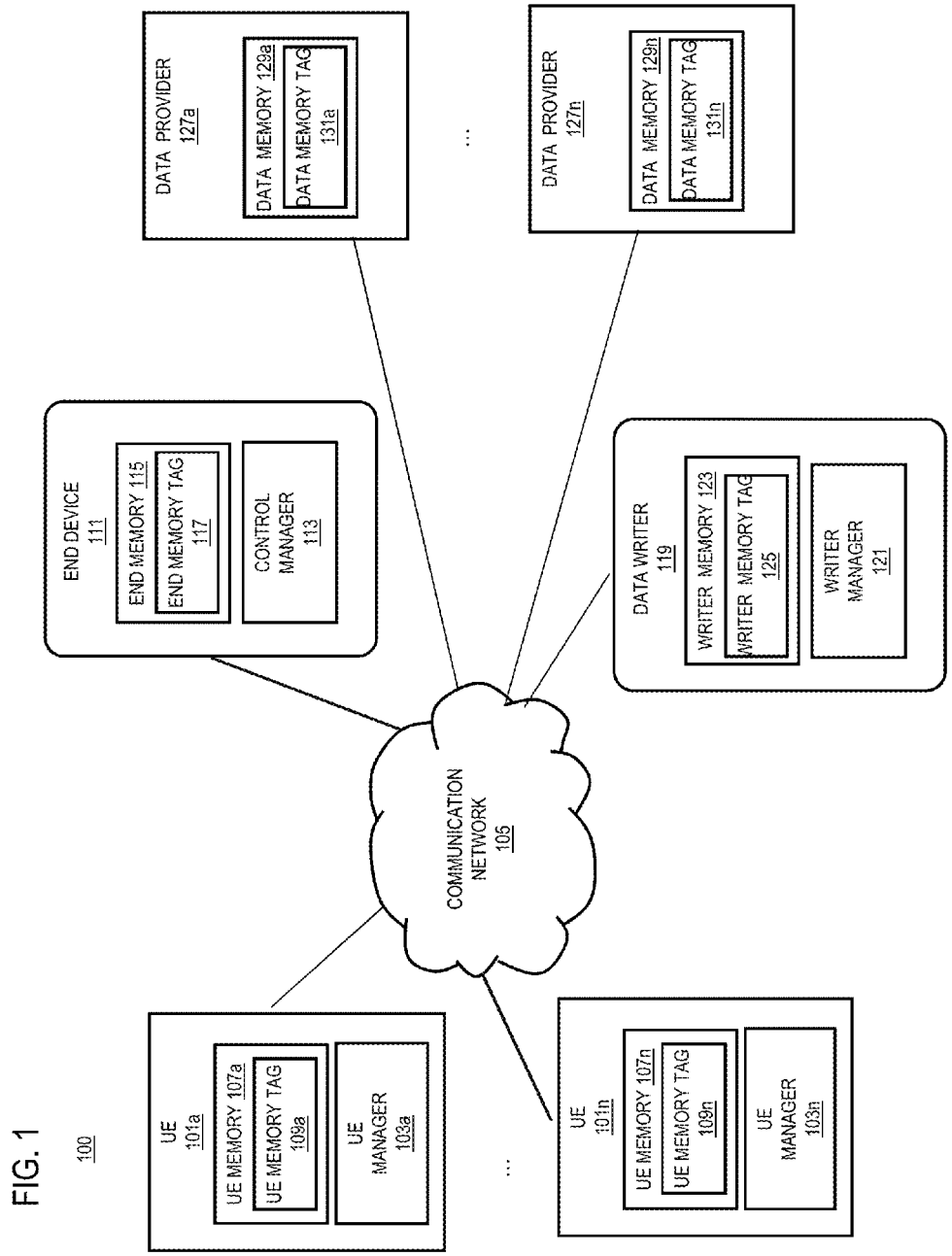
FIG. 1 is a diagram of a system capable of performing a multi-role communication using a Radio Frequency (RF) memory tag, according to one embodiment.

FIG. 1 is a diagram of a system capable of performing a multi-role communication using a memory tag (e.g. RF memory tag), according to one embodiment. As discussed previously, the transfer of information may be performed in various ways depending on the role functionalities of memory tags and related devices. It may be beneficial to configure a memory tag to perform multiple roles because the memory tag may be used to assume different roles, such that one memory tag may be used for multiple roles instead of using multiple memory tags for respective multiple roles. For example, multiple roles by the memory tag may be advantageous in communicating with different devices, wherein the different devices may perform different roles from one another, with respect to the memory tag. As another example, a single device may also have multiple roles, wherein the roles may change depending on different conditions such as time. Hence, the memory tag being capable of multiple roles may simplify the communication process by reducing the number of memory tags being used for the number of roles. However, incorporating multiple roles in a single memory tag may cause complexity implementation and may involve additional devices.

To address this problem, a system 100 of FIG. 1 introduces a mechanism to enable a memory tag to implement various types of connectivity to different devices depending on the specific roles of the devices seeking access to the memory tag. In other words, the system 100 enables the transfer of data and/or performing of tasks according to the different access policies based on the roles of the devices accessing the memory tag. In one embodiment, the roles may depend on a direction of the communication (e.g. a direction of data transfer), types of devices involved in the communication, and other conditions such as powering conditions of the devices or the time of the access of the memory tag. In some embodiments, the role may also depend on the physical direction from which a device is accessing a memory tag. For example, accessing the memory tag from a top direction specifies one role, while accessing the memory tag from a bottom direction specifies another role. Hence, a single device may be capable of handling multiple activities of multiple roles.

For example, the access policies for certain communications with respective devices may determine whether the communication may enable read operations, write operations, execute operations, or a combination thereof. In one example, the multi-role tasks may provide read only (RO) rights when communicating in one direction, while including read, write, and execute (RWX) rights in the other direction. The multiple roles may be configured by restricting or broadening the communication access, wherein one access policy may restrict the access to RO in one direction of communication and another access policy may broaden the access to RWX in the other direction. Further, there may be separate channels for performing different types of communication between devices. For example, there may be a control channel for transferring control data (e.g. "clicks" of read content, timestamp data, etc.). The data channel may be used to perform data transfer between devices, wherein the data transfer is performed according to the control data. Thus, in one example, the data channel may be connected to a different portion of an end point device from the control channel. Also, the request for the data may be independent from the request for the control. For example, the user may request a currently available content from a data provider, and the data provider may request control information from the user or from the used tag(s). Then, the user (or a data provider or other devices) with management rights may use the memory tag to convey the control data including control information such as the number of clicks, the need for content update, as well as other management issues. In this case, the control data may be conveyed independently from the user data accesses. The devices may include memory tags that are used for various types of roles. The memory tags may be passive memory tags that may be powered by a power source. For example, a passive memory tag may be powered remotely by another device. In this case, the roles in the communication may be determined based on the powering direction. In addition, when communication between two devices is established, one device may produce representations of the other device that is in communication. The representations may be in visual representations, audio representations, tactile representations or a combination thereof. The representations may also change according to the proximities between the communicating devices.

More specifically, system 100 enables receiving a request at the UE 101 to acquire content data from the data provider 127. UE 101 may contain the UE memory 107 including the UE memory tag 109, to store data, and the UE manager to manage transfer and storing of the data. The UE 101 may send a request to the end device 111, which may communicate with the data writer 119, which may have some or all of the content from the data provider 127 stored within the data writer 119. The content may be stored within the end memory 115, and the transfer and storing of the data may be managed by the control manager 113. The UE 101 may include a user interface that may be used to make the content request at the UE 101, or to enter any other commands, or to display results or process of data transfer between the UE 101 and other devices including the end device 111, the data writer 119 and the data provider 127, or any other tasks. The connection may be established via the communication network 105. The connection or data transfer among the devices including the UE 101, the end device 111, the data writer 119 and the data provider 127 may depend on access policies. The access policies may be set based on the direction of the communication and/or the devices involved in the communication.

For example, a content request from the UE 101 to the end device 111 may have RWX rights such that the content request from the UE 101 may be written and executed at the end device 111, and the UE 101 may also read data from the end device 111. As another example, the UE 101 may have only RO rights when the UE 101 download contents from the end device 111 in response to the content request, such that the UE 101 may access the end device 111 to read the content, but may not write or execute at the end device 111 during this communication. In response to the content request, the end device 111 may retrieve content from the data provider 127. The content may be first transferred from the data provider 127 to the data writer 119. In this example, the writer memory 123 in the data writer 119 may act like a cache for the content. The content is then transferred to the end device 111 according to the content request, and is then downloaded to the UE 101. In this example, the data memory 129 and the data memory tag 131 are located within the data provider 127. However, in another example, although not shown, the data memory 129 and the data memory tag 131 may be separate from the data provider 127 and be externally connected to the data provider 127. In a similar manner, the writer memory 123 and the writer memory tag 125 in another example may also be separate from the data writer 119 and be externally connected to the data writer 119, instead of being inside the data writer 119.

In one embodiment, the end device 111 receives a content request from the UE 101 according to the access policy for this communication. The access policy may specify accessibility and rights with respect to read operations, write operations, execute operations, or a combination thereof, for the respective devices involved in the communication and the direction of the communication. Thus, this access policy is specific for the content request communication from the UE 101 to the end device 111. The UE memory tag 109 and the end memory tag 117 may be used to perform communication and to transfer data between the UE 101 and the end device 111. The control manager 113 may then determine a source where the end device 111 may acquire the requested content. When the source for the requested content is determined, the end memory tag 117 may access the source according to the access policy for this communication, so as to acquire the requested content from the source. In one example, this access policy may enable writing the requested data to the end memory 115, as well as reading and executing at the end device 111, thus including the RWX rights. The requested content data in the end device 111 is then transmitted to the UE 101 according to the access policy for this communication.

In one example, this access policy may allow only reading from the end device 111, but not writing or executing at the end device 111, thus having only RO rights. Therefore, according to this policy, the requested content in the end device 111 may be read to be downloaded to the UE 101. The source may be the data provider 127 that provides various content data stored in the data memory 129. The source may also be the data writer 119 that has the content data stored in the writer memory 123. The writer memory 123 may act like a cache that can store some or all of the content data from the data provider 127. Then, the requested content data is first transferred from the data provider 127 to the data writer, according to the respective access policy, and then is transferred from the data writer 119 to the end device 111, according to the respective access policy.

Further, the data source may be local to the UE 101, and thus may reside within the UE 101 or may be connected directly to the UE 101. The content data transfer may have a priority order depending on the type of the sources. For example, the data source that is local may have the highest priority, whereas the data provider 127 as the data source may have the lowest priority, and the data writer 119 as the data source may have the medium priority. Then, the transfer of the data may be performed based on the priority orders. In addition, the transferring of the data may include establishing a data channel between the UE 101 and the source, and transferring the requested content via the data channel. The data channel may be established between the UE 101 and the data writer 119. The data channel may also be established between the UE 101 and the data provider 127.

Furthermore, the access policy may be determined based on the powering field direction. In particular, the access policy for an access in a direction of the powering field direction may be set in a certain way, and another access policy for an access against the direction of the powering field direction may be set in another way. For example, if the end memory tag 117 is a passive memory tag, then a powering field from another device such as the data writer 119 may activate the end memory tag 117. This powering field travels from the data writer 119 to the end device 111, and may travel to the UE 101. Thus, in one example, the access policy in the direction of the powering field direction (e.g. from the data writer 119 to the end device 111) may be set to include writing operations, while the access policy against the direction of the powering field direction (e.g. from the UE 101 to the end device 111) may be set to include only reading operations. Therefore, this may help enhance security by restricting access by the UE 101 to only the reading operations. Further, the access from other devices to the end device 111 may also be in various angles with respect to the direction of the powering field. For example, in a memory tag 117 may be mounted in a service kiosk in a way that allows the UE 101 (e.g., a consumer device) to power the field only from the top of the memory tag 117, which will grant read only access. At the same time, the data writer 119 is mounted within the kiosk and has access to power the memory tag 117 from below, which provides full RWX access to the data writer 119.

Some or all of the devices including the UE 101, the end device 111, the data writer 119 and the data provider 127 may also have a user interface providing representations of the devices or memory tags that are connected. The representations may include visual representations, audio representations, tactile representations, or a combination thereof. The representations may change based on the proximities between the devices that are connected. For example, the UE 101 may have a user interface that shows a visual representation of the end device 111, as a connection is established between the UE 101 and the end device 111. As the UE 101 becomes closer to the end device 111, the visual representation of the end device 111 displayed at the UE 101 may become larger, to show the proximity of the UE 101 to the end device 111. The visual representation of the end device 111 may change depending on the signal strength in communication between the UE 101 and the end device 111. In one embodiment, the roles of the devices including the UE 101 and/or the end device 111 may change depending on the proximity or the signal strength. For example, the roles may change to enable a user of the UE 101 to have more access (e.g. RWX rights) to the end device 111 when the user of the UE 101 is near the end device 111. When the UE 101 is far from the end device 111, the role for the UE 101 may change to grant less access (e.g. Read Only rights). This feature may be advantageous in a social networking context in that when the user is close enough to be visible to the other user, the user may be more trusted and thus may be granted more access, than when the user is far from the other user.

The UE 101 has the UE memory 107 to store data including user information, authentication information, software application, user interface application, communication information, communication history, digital media (pictures, video and audio files, etc), contact information, web browsing information, and etc. Further, the end device 111 has the end memory 115 to store content data from the data provider 127. The end memory 115 may include a non-volatile memory (NVM) such as a flash memory, universal file storage/Execute in Place (UFS/XIP) type PCM memory, etc. In one embodiment, the transfer of information to the end device 111 from the data source such as the data writer 119 or the data provider 127 may be based on memory tags (e.g. RF memory tag) associated with the end device 111 and the data writer 119, respectively. As an example of the data source including the RF memory tag (e.g. NVM PCM memory and a RF part), the end device 111 may act as a passive end point that is turned off without power or an active end point with power on. For the passive end point, the data writer 119 or the data provider 127 may provide power and data to the passive end point, which is the end device 111 in this example, whereas the end device 111 may provide only data to the active end point, which is the data writer 119. The memory tags may also be utilized in the UE 101 and the data provider 127, as UE memory tag 109 and the data memory tag 131, to enable transfer of data between the memory tags.

In one embodiment, the RF memory tag uses short range connectivity such as Ultra High Frequency/Near Field Communication (UHF/NFC) and/or Impulse based Ultra Wideband (I-UWB). UHF/NFC may be produced by an end unit such as a reader or a writer at the data writer 119 and may be used to provide a power field (thus controlling the end device 111 with this power field), whereas I-UWB may be used for data transfer between the memory tags of the either the writer device or the reader device, wherein the short range connectivity may be provided as a structure embedded with the RF memory tag or as a peripheral device connected to the RF memory tag. The RF memory tag may also be present as a part of the end device 111, such that data can be transferred between the data writer 119 and the end device 111 using a short range connectivity, wherein the data can be transferred to a RF memory tag embedded in the data writer 119 or another storage medium supporting a UFS/XIP memory architecture in the data writer 119, for example. Further, this approach may provide a high capacity NVM memory with a RF part providing a high data rate of transfer.

As shown in FIG. 1, the system 100 comprises user equipment (UEs) 101a-101n having connectivity to UE managers 103a-103n respectively via a communication network 105. The UE managers 103 may act as an interface between one or more UEs 101 and one or more end devices 109. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The communication network 105 may also involve a connection between a device of an active end point and a device of a passive end point, wherein the active end point provides a power field to the passive end point via a short range radio or wireless connection (e.g. UHF/NFC) and provides a data connection (e.g. I-UWB and other high frequency bands such as 60 GHz) between the device of the active end point and the device of the passive end point. In one example, the device of the active end point may be the writer device at the end device 111 and the device of the passive end point may be the RF memory tag with short range wireless connectivity at the UE 101. However, any device may be the active end point or the passive end point.

The UEs 101a-101n or the data writer 119 are any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UEs 101a-101n can support any type of interface to the user (such as "wearable" circuitry, etc.). In one embodiment, each of the UEs 101a-101n may include a respective memory 107 to store data. The memory 107 may include a memory tag 109. In addition or alternatively, the memory tag 109 may be external to the UE 101 (e.g., connected via an external dongle device). By way of example, the memory tag 109 is a near field communication (NFC) tag, radio frequency identification (RFID) tag, contactless card, a wirelessly powered memory tag, or the like that includes sufficient memory to store information related to the respective UE 101. The memory tag 109, for instance, is associated (e.g. embedded in or attached to) one or more of the UEs 101 capable of supporting the information management processes of the approach described herein. In one embodiment, the memory tag 109 (e.g. the RF memory tag or embedded RF memory tag) is a high memory capacity NFC tag that contains several gigabits of memory with fast access and download times. It is contemplated that the memory tag 109 may also be any similar wirelessly powered memory tag. In one example, UHF/NFC or any radio that provides a power field may power the memory tag 109.

By way of example, NFC, RFID, contactless card, and similar technologies are short-range wireless communication technologies (e.g., Ultra High Frequency/Near Field Communication (UHF/NFC), Impulse based Ultra Wideband (I-UWB, and/or other high frequency bands such as 60 GHz)) that enable the exchange (e.g., both reading and writing) of data between devices and tags over short distances (e.g., the range for NFC is approximately 4 inches). In general, these technologies comprise two main components, a tag (e.g., attached to a UE 101 or a data writer 119, as an embedded structure such as a RF memory tag card or as an accessory such as a separate entity that the UE 101 or the data writer 119 and/or the end device 111 accesses wirelessly) and a reader/writer (which can be implemented within the UE 101 or the data writer 119). Communication between the reader/writer and the tags occur wirelessly and may not require a line of sight between the devices. The tag (e.g., an RFID transponder) is, for instance, a small microchip that is attached to an antenna.

The tags can vary in sizes, shapes, and forms and can be read through many types of materials. Moreover, the tags may be passive tags or active tags. Passive tags are generally smaller, lighter, and less expensive than active tags. Passive tags are only activated when with the response range of a reader/writer. In other words, passive tags are typically memory tags that are wirelessly powered by the reader/writer. The reader/writer emits a low-power radio wave field that is used to power the tag so as to pass on any information that is contained on the chip. Active tags differ in that they incorporate their own power source to transmit rather than reflect radio frequency signals. Accordingly, active tags enable a broader range of functionality like programmable and read/write capabilities. The read/write capabilities of the UE memory tag 109 can, for instance, enable the system 100 to write comments for storage in the UE memory tag 109 for retrieval by other users or update the content of the UE memory tag 109 to include the latest content. For example, the UE memory tag 109 associated with an advertisement can be updated to contain the latest pricing and availability information. The writer memory tag 125 and the end memory tag 117 may also include the similar functionalities of the UE memory tag 109.

A reader/writer device typically contains a transmitter, receiver, control unit, and an antenna, as well as a memory, which may be a high capacity memory storage. The memory may include an embedded tag. The reader/writer performs several primary functions: energizing/powering the tag, demodulating and decoding the returned radio signal, transferring data, and providing clock information. The clock information may include information about a continuous wave clock that may be used to activate and power the tag. In certain embodiments, a reader/writer includes an additional interface to convert the returned radio signal to a form that can be passed to another system such as a computer or programmable logic controller.

Therefore, the advantage of this approach is that a memory tag 117 may provide for multiple roles depending on conditions such as the devices involved in the communication and the communication direction, and thus provides a way to perform different types of communication using a single memory tag. Therefore, this feature enables flexible use of a memory tag 117 and avoids use of multiple devices or multiple memory tags 117 to perform different roles. Therefore, means for performing a multi-role communication using a RF memory tag is anticipated.

By way of example, the UE 101, the end device 111, and the data writer 119 communicate with each other and other components of the communication network 105 using well known, new or still developing protocols. The data provider 127 may also communicate with the UE 101, the end device 111, and the data writer 119 via the communication network 105. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
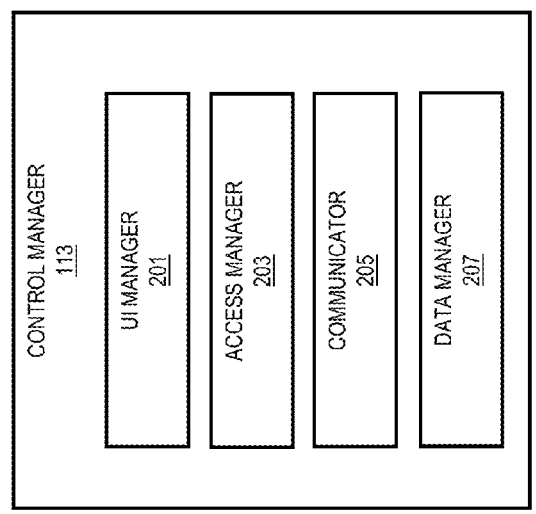
FIG. 2 is a diagram of the components of the control manager, according to one embodiment.

FIG. 2 is a diagram of the components of the control manager 113, according to one embodiment. By way of example, the control manager 113 includes one or more components for managing the end device 111 and the interaction between the end device 111 and other devices and/or data providers. It is contemplated that the functions of these components may be combined in one or more components or performed by other components of equivalent functionality. In this embodiment, the UE manager 103 includes a user interface (UI) manager 201, access manager 203, communicator 205 and a data manager 207.

In one embodiment, the control manager 113 receives a content request from the UE 101 and manages retrieving of the content data from data sources according to the content request from the UE 101, such that the requested content data may be uploaded to the UE 101. The UI manager 201 may be used to receive the content request via the user interface of the UE 101 and communicate the request and information included in the request to other components of the UE 101. The information included in the content request may contain information about the content, a possible target device, the information about the UE 101, and etc. The UI manager 201 may also manage displaying connections established with other devices and data sources on the user interface, and may display on the user interface the status or access policies for communication with each device. Further, the UI manager 201 manages presenting representation of a device that is connected to the end device 111. The representation may be visual representation, but may also be audio or tactile representation, and is specific to the device connected to the end device 111, so as to identify the device.

The access manager 203 manages access to the end device 111 from other devices including the UE 101, the data writer 119 and the data provider 127. Thus, the access manager 203 may determine access policies based on the device communicating with the end device 111 and a direction of the communication. In one example, for the communication access between the end device 111 and other devices, the access manager 203 may set the communication policy to restrict the communication access to read only (RO) or to broaden the communication access to read, write and execute (RWX). As noted previously, the access manager 203 may also consider a powering field direction with respect to a device in communication, in determining the access policy. For example, if the end memory tag 117 of the end device 111 is a passive memory tag, and the data writer 119 is a powering device powering the end memory tag 117, the data writer 119 accessing the end device 111 is in the direction of the powering field. On the other hand, if the UE 101 is on the other side of the data writer 119 powering the end device 111 and does not power the end device 111, then the access from the UE 101 to the end device 111 is against the direction of the powering field. Therefore, depending on the direction of the powering field, different access policies may be set for the access, and thus the role of the device depends on the direction of the powering field.

The communicator 205 manages various types of communication with other devices such as the UE 101, the data writer 119 and the data provider 127, as well as communication within the end device 111 (e.g. between the components within the end device 111). The communicator 205 may be used to manage communication between the end memory tag 117 and other memory tags including the UE memory tag 109, the writer memory tag 125 and the data memory tag 131. The access manager 203 and the communicator 205 communicate with each other so that the communicator 205 may perform communication based on the access policies managed by the access manager 203. The communicator 205 may also consider the priority order for communication and perform communication in the order of the priority. For example, the priority of the data for transfer may be determined by the source of the data, wherein the priority level is high for the local storage as a data source, medium for the data writer 119 as the data source, and low for the data provider 127 as the data source. The data writer 119 may be a cached data writer, which is either nomadic or stationary. Then, the data of the high priority will be transferred first and the data of the low priority will be transferred last. Further, the communicator 205 may determine the proximity between the end device 111 and a device connected to the end device 111, such that the UI manager 201 may adjust the representation of the connected device based on the proximity, and may also adjust the roles of the connected device. In one embodiment, the signal strength may also affect the representation of the connected device as well as the roles of the connected device.

The data manager 207 manages the data at least according to their characteristics and other factors such as the data source. The data manager 207 also determines whether to transfer data from the end memory tag 117 to another storage area in the end memory 115.

Figure 3:
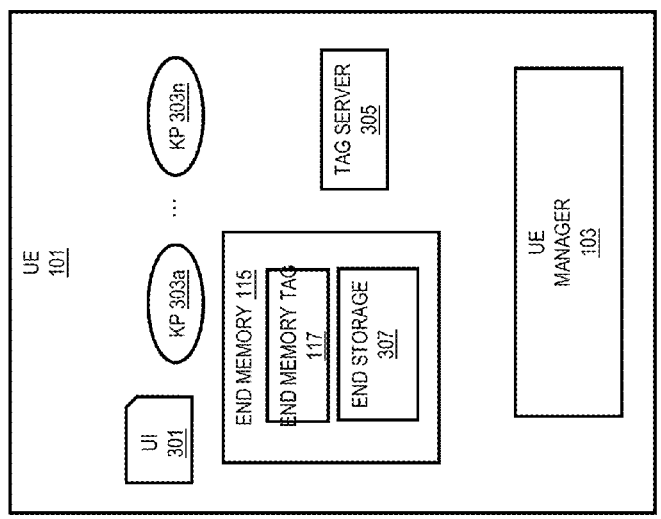
FIG. 3 is a diagram of the components of the end device, according to one embodiment.

FIG. 3 is a diagram of the components of the end device 111, according to one embodiment. The end device 111 includes a user interface 301 to provide a presentation that the user can use to interact with the end device 111. The end device 111 may also include the control manager 113 to manage interactions such as data transfer between the end device 111 and the UE 101 as well as the data writer 119 and/or the data provider 127. The control manager 113 also interacts with the end device 111 to manage any type of inputs into the end device 111. The knowledge processors KP 303a-303n are components that process the user data. A knowledge processor 303 may be located in various locations throughout the information space environment, including the end device 111.

In one embodiment, the end memory tag 117 can be an internal component of the end device 111 (e.g., an embedded tag) or an external storage device and/or knowledge processor 309 connected to the end device 111. The tag server 305 manages the access to the end memory tag 117 and operations such as reading, writing and organizing of information on the end memory tag 117. For example, the tag server 305 manages metadata/content as well as the role with regard to the data in the end memory tag 117, wherein the data in the end memory tag may be cached data. Thus, the tag server 305 may enable passive end point roles for other devices such as the end device 111. Further, the tag server 117 may manage and update the content in the end device 111, and further consider the number of user clicks in transfer of data. In addition, the tag server 305 may also parse content from inter-/intra-device memory locations, such as storage media and memory tags. Further, the end device 111 may include the end storage 307. The end storage 307 provides a larger storage capacity than the end memory tag 117. Thus, the data received via the end memory tag 117 may be transferred to the end storage 307 for a long-term storage.

Figure 4:
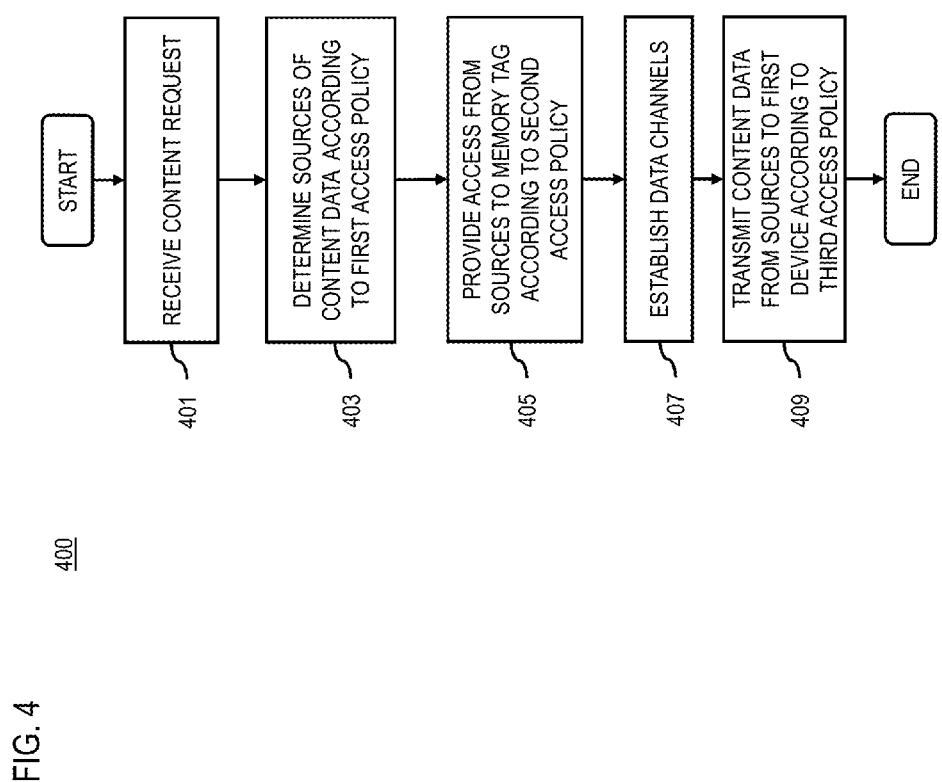
FIG. 4 is a flowchart of a process for performing a multi-role communication using a Radio Frequency (RF) memory tag, according to one embodiment.
Figure 12:
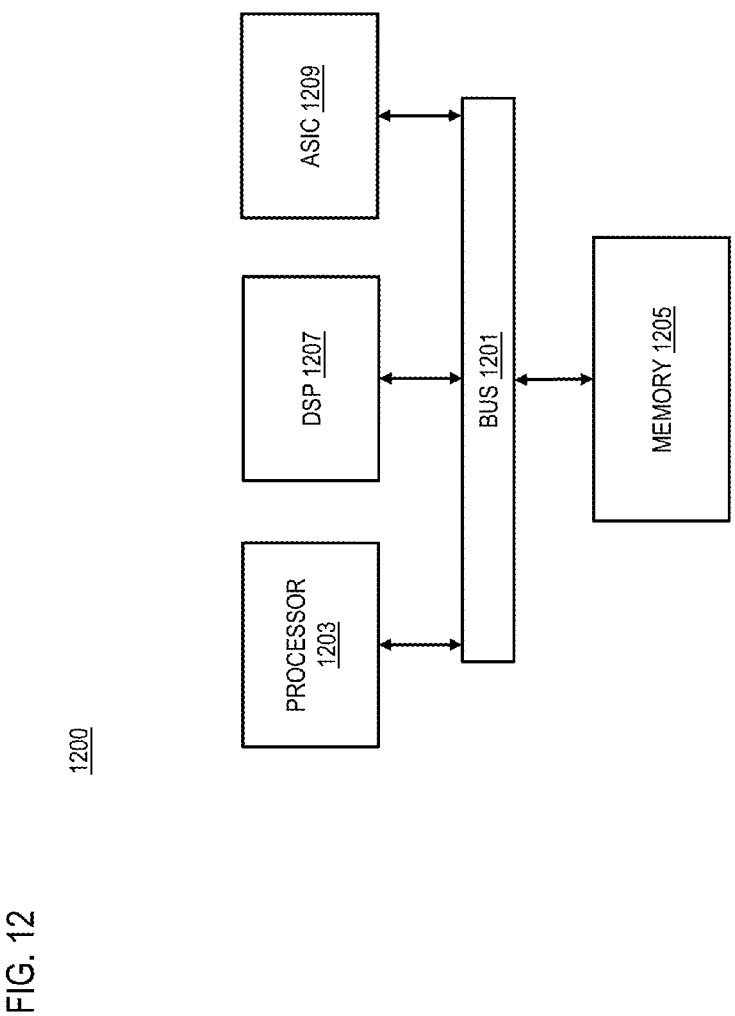
FIG. 12 is a diagram of a chip set that can be used to implement an embodiment of the invention.

FIG. 4 is a flowchart of a process for performing a multi-role communication using a Radio Frequency (RF) memory tag, according to one embodiment. In one embodiment, the control manager 113 performs the process 400 and is implemented in, for instance, a chip set including a processor and a memory as shown in FIG. 12. In step 401, the control manager 113 receives the content request from a first device. The content request may be transmitted from the UE 101 and may be received at the end memory tag 117 of the end device 111. In step 402, the control manager 113 determines the source of the content data responsive to the content request according to the first access policy. The first access policy may be specific to the communication between the UE 101 and the end memory tag 117 described in step 401. In particular, the control manager 113 may consider information from the content request or the information related to the content request, so that the control manager 113 can determine the source of the content data. The source of the content data may be in various locations. For example, the source may be the end device 111, the data writer 119, the data provider 127, the UE 101, or a combination thereof. Further, the control channel may be established between the sources and the end device 111 to exchange information about access policy and management for transfer of content data, as well as content update. Then, in step 405, the control manager 113 provides access from the sources to the end memory tag 117 according to a second access policy. This access may provide a way to acquire requested content from the sources and to update the content. The data channels may be established between the UE 101 and the sources, as shown in step 407, so as to transfer the requested content. The data channels may run from the sources to the UE 101 via the end device 111, or may be directly connected to the UE 101. The control channel and the data channel may be independent from each other. Further, the control channel may be connected to a different portion of the end device 111 than the data channel. Then, in step 409, the control manager 113 causes transmission of the content data from the sources to the UE 101 according to the third access policy. In one example, the requested content may be received at the end device 111 from the sources, and then may be downloaded to the UE 101 according to the third access policy. Further, there may be a cache existing in one or more of the devices including the UE 101, the end device 111 and the data writer 119. The cache may store some or all of the content from the data provider 127 such that this stored content may be easily transferred to a requesting device later. For example, the data writer 119 may have the writer memory 123 as a cache, such that the content from the data provider 127 may be downloaded to the writer memory 123 for a later use or data transfer. In addition, if there is a disruption during the data transfer, the link and the session related to the data transfer is kept on hold (paused), and the physical layer parameters are renegotiated for the paused session after the disruption is resolved.

The access policy may be specific to a communication, wherein the access policy applies to the communication that satisfies conditions for the access policy. The access policy may also be specific to a device or specific to a memory in communication. For example, if the access policy is memory-specific, the same access policy may apply to various devices communicating with the same memory tag. Further, multiple user devices may share the same access policy. The access policy may also vary depending on a time or a schedule. For example, the access policy may be different during work days from the access policy on weekends. Further, different user devices (e.g. UEs 101a-101n) may belong to the same group, sharing common access features. Then, the access policy may depend on a group of user devices, wherein the group of user devices may share access to all or a portion of the data provider 127 and/or the data writer 119. The access policy may be the same for all user devices that belong to the same group. Alternatively, the user devices in the same group may have some overlapping access policies, and other access policies that are different depending on the user devices.

The data may have different priority levels, which determine the order of the data transfer. In one example, the priority level may be based on the type of the data sources. For example, if the data source is local in the UE 101 or the end device 111, the priority level may be high. If the source of the data is in a cache (e.g. the writer memory 123 of the data writer 119), then this data may have a medium priority level. If the source of the data is in the data provider 127, then this data may have a low priority level. Then, the priority order in data transfer from the source may be based on the type of the sources. Therefore, the requested data may be listed according to the priority level and placed in a query, such that the requested data may be acquired in this priority order in the query. In particular, the request for content may include a query indicating that multiple data from different sources are to be acquired. Then, the query may be decomposed to sub-queries corresponding to the respective multiple data, and thus each sub-query is assigned to respective sources. The sub-queries are then aggregated such that the multiple data from different sources may form the requested content. The sub-queries may be arranged in the order of the priority level, wherein the priority level is determined based on the source of the data for each sub-query. Then, the data is streamed according to the sub-queries arranged according to the priority level.

The access policy, including the first, second and third access policies, may specify accessibility and rights with respect to various operations. For example, the access policy may specify accessibility and rights with respect to read operation, write operation, execute operation, or a combination thereof. The access policy also depends on the devices involved in the communication and the roles associated with the respective devices, as well as the communication direction between the devices.

Further, the access policy may be determined based on the powering field direction. The memory tags including the UE memory tag, the end memory tag 117, the writer memory tag 125 and the data memory tag 131 may be passive or active. If the memory tag is a passive memory tag, then it can be powered by another device that produces a powering field. For example, the data writer 119 may be a powering device to power the end memory tag 117, if the end memory tag is a passive memory tag. Then, for a communication in the direction of the powering field, which is from the data writer to the end memory tag 117, the access policy specific to the direction of the powering field may be used. On the contrary, for a communication in the direction against the direction of the powering field, another access policy may be used. Thus, if the communication is from the UE 101 located on the other side of the end memory tag 117 to the end memory tag, the direction of this communication may be against the direction of the powering field, and thus the access policy for the direction against the powering field may be used.

The access may also be determined based on the angle of the direction of the communication with respect to the direction of the powering field. For example, a device communicating with the passive memory tag at a 30 degree angle with respect to the powering field direction may be under a different access policy than another device communicating with the passive memory tag at a 60 degree angle. The access policy may further depend on the location of the powering device. For example, devices located on the same side as the powering device with respect to the passive memory tag may utilize the writing field created between the powering device and the passive memory tag, so as to write data to the passive memory tag. On the other hand, if the device is located at the opposite side of the powering device, then the device cannot utilize the writing field created between the powering device and the passive memory tag, and may only utilize the reading field existing between the passive memory tag and the device, to read data from the passive memory tag. The reading field does not enable writing to the passive memory tag. The access policy may provide This process shown in FIG. 4 is advantageous in that it enables a memory tag or a device to have multiple roles by assigning various access policies depending on conditions. In particular, a memory communicating with a device may have a read only operation while the memory communicating with another device may have a read write execute operation. Thus, this process provides a flexible use of a memory tag, and reduces the cost and complexity of involving multiple tags or devices to provide multiple roles. The control manager 113 is a means for achieving these advantages.

Figure 5:
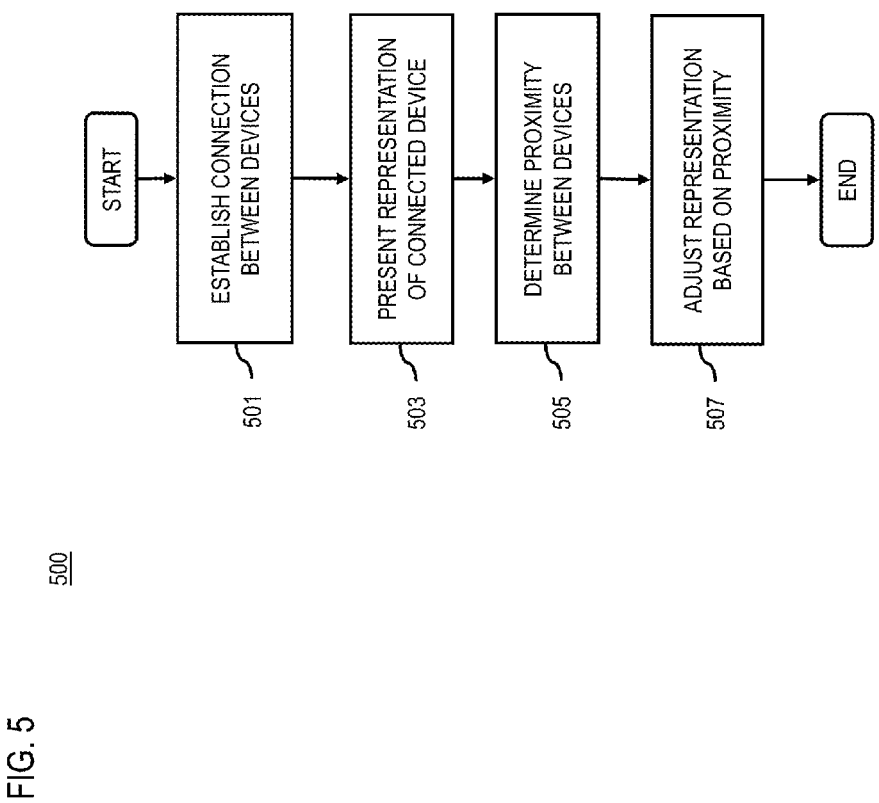
FIG. 5 is a flowchart of a process for providing representation of a communicating device, according to one embodiment.

FIG. 5 is a flowchart of a process for providing representation of a communicating device, according to one embodiment. In one embodiment, the control manager 113 performs the process 500 and is implemented in, for instance, a chip set including a processor and a memory as shown in FIG. In one embodiment, the UE manager 103 may also perform the process 500 for the UE 101. 12. In step 501, the control manager 113 establishes connection between the devices (e.g. between the end device 111 and a communicating device). Then, in step 503, the control manager 113 causes presentation of a user interface representing the entity related in the communication. The entity may be any type of device, a memory tag, data source, content data or a combination thereof, and the representation of the entity may be presented at the user interface to show the identity of the entity. The representation of the device involved with the communication with the end device 111 may be visual representation, audio representation, tactile representation, or a combination thereof. The device in communication (i.e. connected device) may have identity information that the end device 111 may retrieve to present a corresponding representation. For example, a memory tag of the connected device may have identity information that can be retrieved by the end device 111 upon connection. The example of the visual representation may be a graphic icon that represents the device connected to the end device 111. The audio representation may be a sound specific to the device connected to the end device 111. The tactile representation may be in a form that can be felt by a user, such as a vibration or a vibration pattern that is specific to the device connected to the end device 111. The representation may be customized or may also be downloaded from a collection of representations provided by a service provider.

Then, in step 505, the proximity between the end device 111 and the communicating device is determined. By way of example, the proximity may be determined based on the signal strength, proximity sensor, location indicator such as a global positioning system (GPS) device, and etc. In step 507, the representation may be adjusted at the user interface in the end device 111 based on the proximity. For example, if a graphical icon is used as a visual representation for the connected device, as the connected device becomes closer to the end device 111, the graphical icon displayed in the user interface of the end device 111 may become larger and larger. If an audio representation is used, the audio sound may become louder as the connected device becomes closer to the end device 111. Further, if vibration is used for the tactile representation, the vibration pattern may change as the connected device becomes closer to the end device 111 (e.g. more intense vibration as the connected device becomes closer).

In one embodiment, the roles of the end device 111 and/or the UE 101 may be adjusted depending on the proximity. By way of example, RWX rights may be given to the UE 101 if the UE 101 is within a predetermined distance from the end device 111, whereas only read only rights are given to the UE 101 if the UE 101 is outside the predetermined distance from the end device 111. Similarly, a signal strength between the connected devices (e.g. between the UE 101 and the end device 111) may be considered in adjusting the representation and/or the roles of the connected devices.

In another embodiment, the visual representation may be used in payment recognition at pay terminals. For example, the end device 111 may be a cashier's device or a pay station for public transportation. Then, as the UE 101 is brought close to the end device 111, the representation of the end device 111 is displayed at the user interface of the UE 101, and the representation of the UE 101 is displayed at the user interface of the end device 111. The identity information related to the user may be used in display of the representation of the UE 101. For example, the visual representation of the UE 101 displayed at the end device 111 may further be based on exchanged secure (and/or encrypted) identity retrieved from a data base containing information of various users and the user devices. This may be useful in distinguishing between loyalty customers and regular customers, wherein their qualifications for being loyalty customers are stored in the data base. Further, the item to be purchased in a store may also have a memory tag that has the item's identity including the item information as well as its price. This item's identity may also be displayed at the UE 101 as a visual representation for the item, as well as the visual representation for the cashier's device. The user then can interact with the cashier's device to purchase the item displayed as the visual representation at the UE 101. At the cashier's device, the visual representation for the UE 101 and the visual representation of the item that the user is attempting to purchase may be displayed in the user interface. The visual representation for the item may be color coded, wherein the color of the visual representation changes upon completion of the payment for the item.

Further, in another embodiment, for communication between two devices, a common end point may be used to manage the communication between the two devices. For example, if the UE 101 cannot reach the end device 111, the UE 101 may send the identity information to the common end point (not shown), and then the common end point may forward the identity information of the UE 101 to the end device 111 such that a corresponding representation may be displayed at the end device 111. Similarly, the end device 111 may send its identity information to the common end point, which then forwards the identity information of the end device 111 to the UE 101. The common end point may also determine which identity information may be forwarded and which identity information may be blocked. For example, if the common end point determines that the communication between the UE 101 and the end device 111 are to be blocked, due to security reasons, for example, then the identity information of the UE 101 and the end device 111 is not forwarded.

This process shown in FIG. 5 is advantageous in that it presents an identity of a device in communication. In particular, a representation of the communicating device may be presented in a visual, audio or tactile form so as to help user recognize the device in communication. The control manager 113 is a means for achieving these advantages.

Figure 6A:
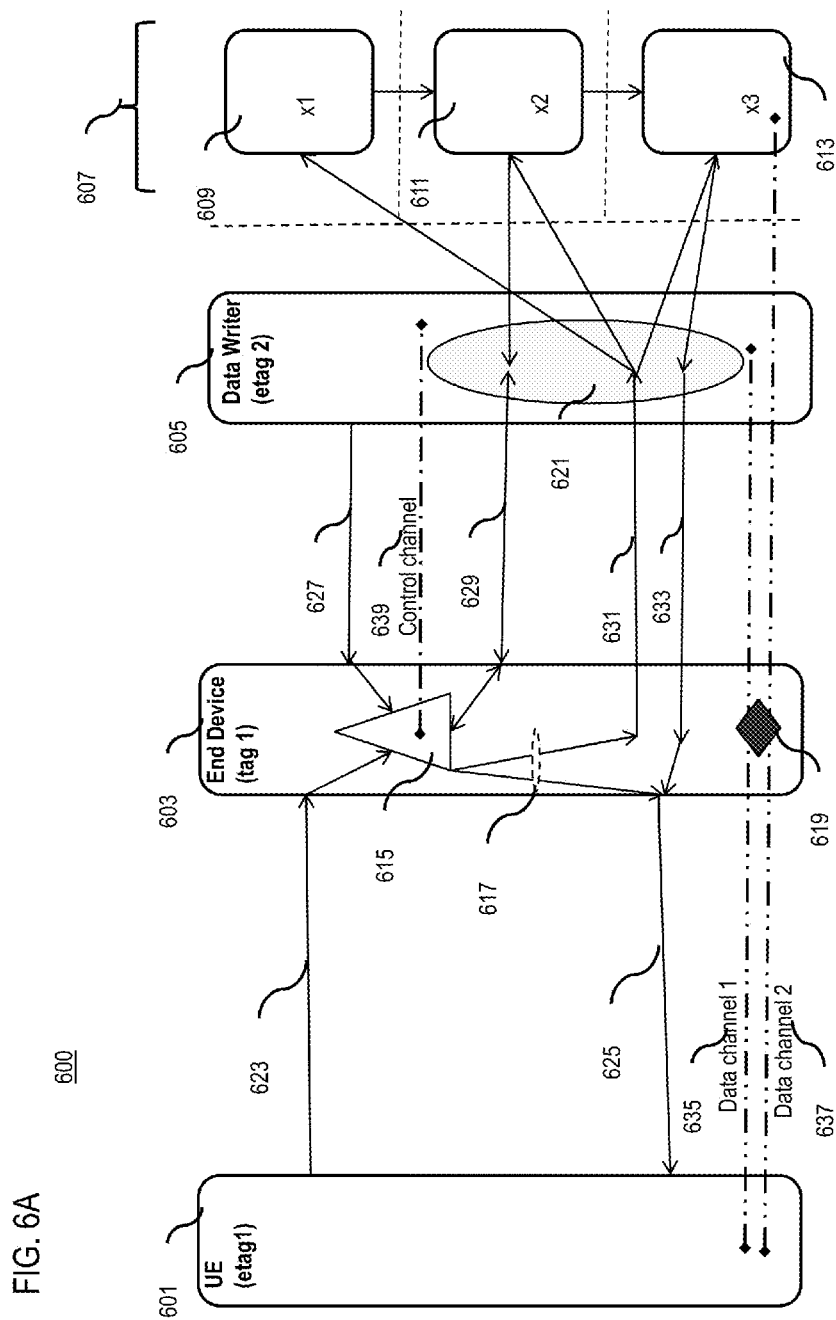
FIGS. 6A-6C are example diagrams showing interactions between various devices according to the process of FIG. 4, according to various embodiments.
Figure 6B:
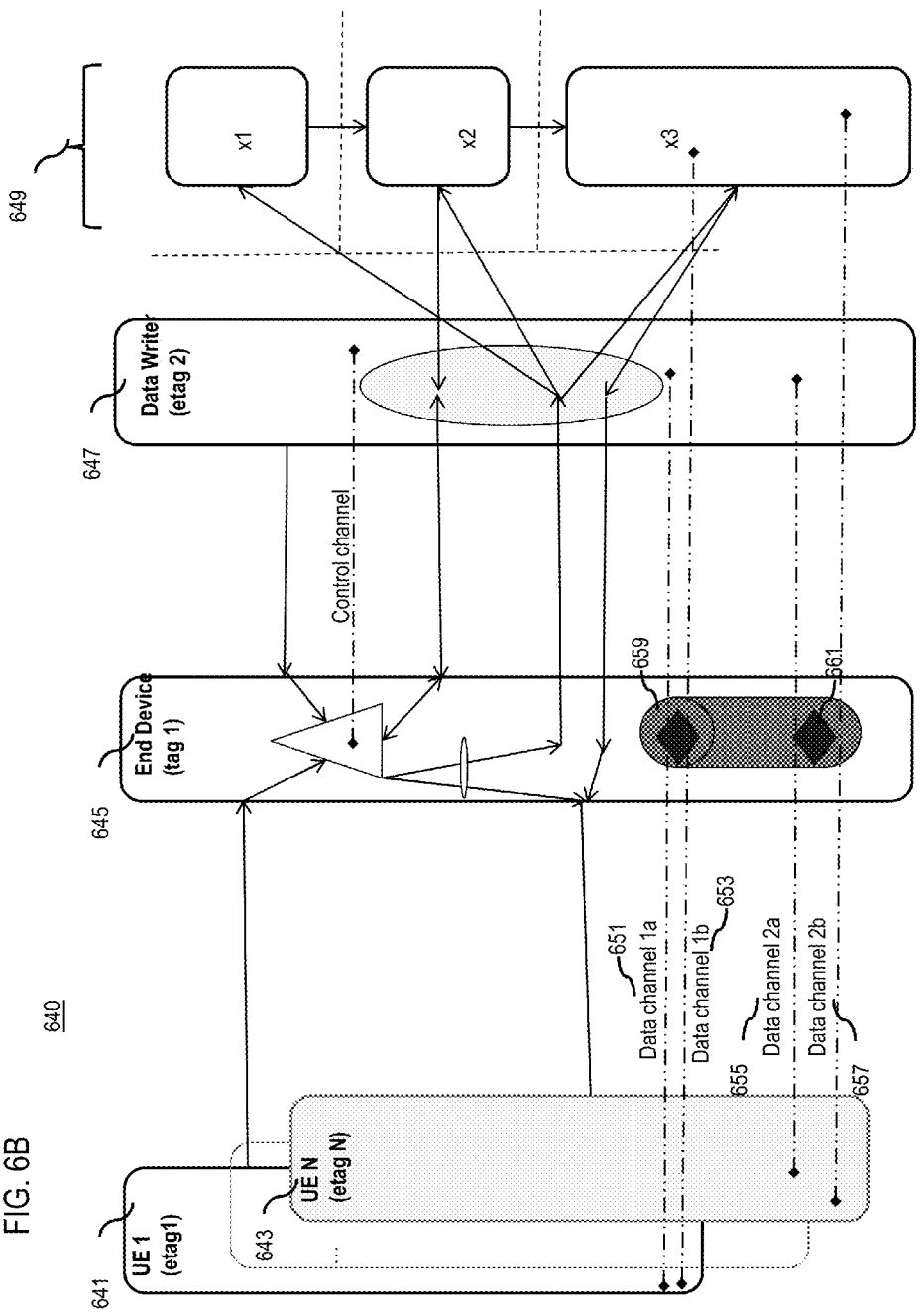
Figure 6C:
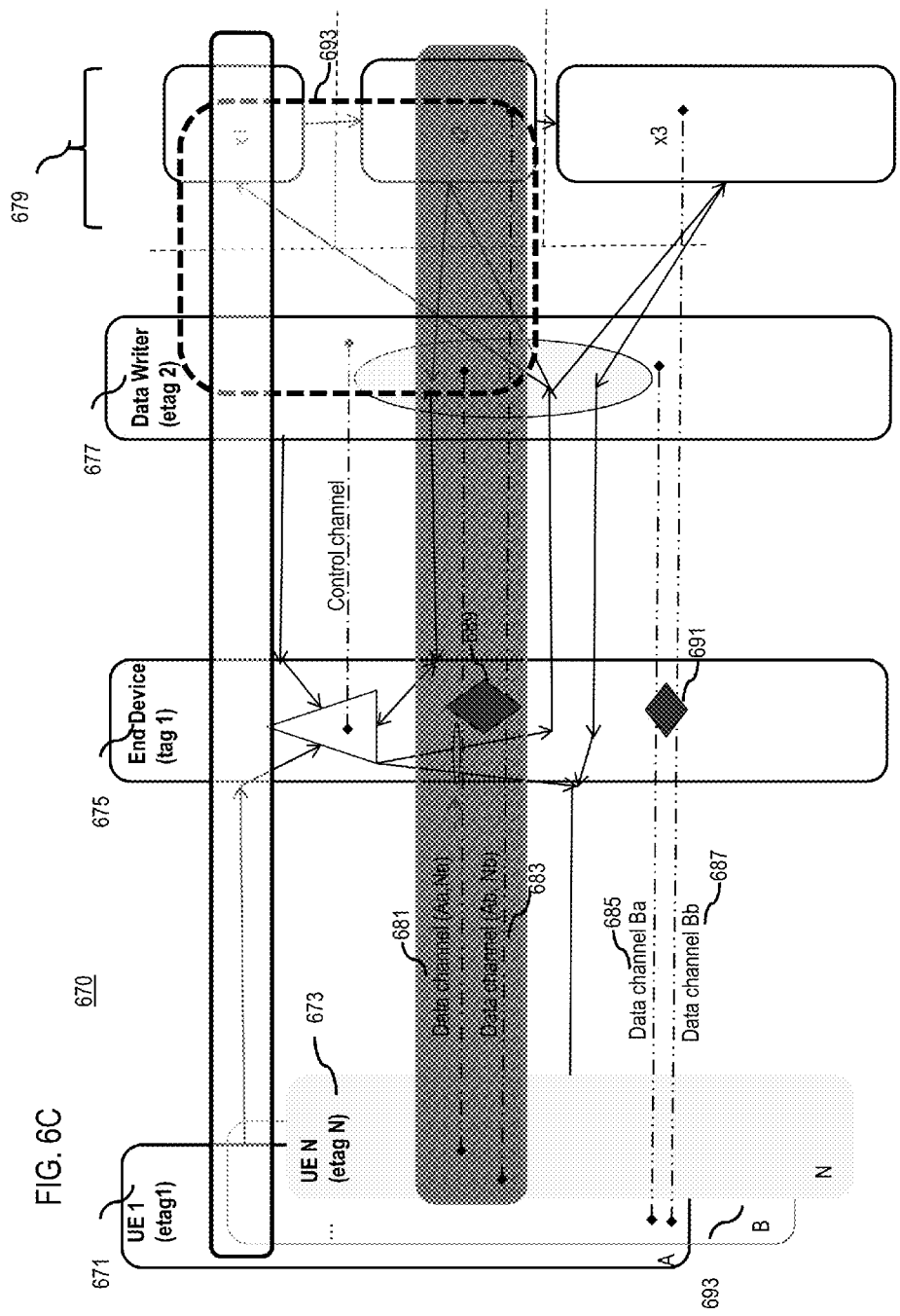

FIGS. 6A-6C are example diagrams showing interactions between various devices according to the process of FIG. 4, according to various embodiments. In FIG. 6A, this example 600 involves the UE 601 with etag 1, the end device 603 with tag 1, the data writer 605 with etag 2 and the data provider 607 with etags x1 609, 611 and 613. The UE 601, the end device 603, the data writer 605 and the data provider 607 may be equivalent to the UE 101, the end device 111, the data writer 119 and the data provider 127. The end device 603 has a control manager 615, which may be equivalent to the control manager 113, wherein the control manager 615 has selective filter 617 to allow certain action or request. The end device 603 may also have a memory tag 619. The data writer 605 may be a cached data writer and may have a tag server 621 with a writer manager to manage content and perform role management with cached data.

In process 623, the UE 601 transmits a content request to the end device 603, which is sent to the control manager 615. The access policy for this communication in the process 623 may be set to RWX such that the content request may be written and executed at the end device 603. If the requested content is present in the end device 603, then the content may be downloaded from the end device 603 to the UE 601 via the process 625. On the contrary, if the content is present in the end device 603, but is outdated or needs an update, the content is updated via the process 627, which may have an access policy of WRX to write and execute the content update at the end device 603, and then the updated content is downloaded to the UE 601 via the process 625. The access policy for the process 625 may be set to RO such that this process allows only reading the content from the end device 603. The content management signal may be sent to the data writer 605 via the process 629 to determine whether there is an update to the content in the end device 603. The process 629 may have an access policy of WRX in both directions such that data related to content management may be read, written and executed at the end device 603 and the data writer 605.

The update to the content may be downloaded from the data provider 607 via the tag server 621. If the requested content is not present in the end device 603, then the content read request is sent to the data writer 605 via the process 631. If the data writer 605 does not have the content, then the content is downloaded from the data provider 607. If the data writer 605 has the content, then the content read response with the content is transmitted to the end device 603, via the process 633. After receiving the content from the data writer 605, the end device 603 may download the content to the UE 601 via the process 625. The transfer of content between the data writer 605 and the UE 601 may be performed via the data channel 1 635. The content may be first transferred from the data writer 605 to the memory tag 619 at the end device 603, and then transferred to the UE 601. Further, the transfer of content between the data provider 607 and the UE 601 may be performed via the data channel 2 637. The content may be transferred from one or more of the etags x1 609, x2 611 and x3 613 to the memory tag 619, and then to the UE 637.

FIG. 6B shows an example 640 with multiple user equipment, and thus multiple data channels, according to one embodiment. This example involves multiple UEs (i.e. UE 1 641-UE N 643). Therefore, more data channels are used in the example in FIG. 6B than in the example in FIG. 6A. For example, in order for the UE 1 641 to obtain content, the data channel 1a 651 and the data channel 1b 653 may be used to acquire the content from the data writer 647 and the data provider 649, respectively. The data may be transferred to the UE 1 641 via the memory tag 1 659. Further, in order for UE N 643 to obtain content, the data channel 2a 655 and the data channel 2b 657 may be used to acquire the content from the data writer 647 and the data provider 649, respectively. Similarly, the data may be transferred to the UE N 643 via the memory tag 2 661.

FIG. 6C shows an example 640 with multiple user equipments and multiple data channels, and a grouped owned cached data. Similar to the example shown in FIG. 6B, there are multiple data channels for multiple UEs. In this example, the data channel Ba 685 and the data channel Bb 687 may be used to transfer data from the data writer 677 and the data provider 679, respectively, to the UE B 693 and this data transfer may be performed via the memory tag 1 691 in the end device 675. Further, the data channel (Aa,Na) 681 may be used to transfer data from the data writer 677 to the UE 1 671 as well as to the UE N 673. Also, the data channel (Ab, Nb) 683 may be used to transfer data from the data provider 679 to the UE 1 671 as well as to the UE N 673. The UE 1 671 and the UE N 673 may have a group owned cached data 693, owned by both the UE 1 671 and the UE N 673. In this example, the data channels 681 and 683 are shared by the UE 1 671 and the UE N 673. However, in another embodiment, separate data channels may be used for the UE 1 671 and the UE N 673, even if the UE 1 671 and the UE N 673 own the same cached data. Further, although not shown, the data provider 679 may include multiple service providers, and there may be multiple cached data writers. Therefore, the source of the data may include numerous data providers and data writers.

FIG. 7 is an example diagram 700 showing various components of the UE 101 and their functionalities, according to one embodiment. The UI may include management component 713 to perform various managements including Application life-cycle management OTA (over-the air) and other application management, installation, personalization, canceling. Thus, the UI 701 may include the management interface 719 to manage these various aspects of applications related to the UE 101 as well as components of the user interface. The examples of the components for the user interface are the 3$^{rd}$ party applications 715 and the UI library 717. The 3$^{rd}$ party applications 715 may include applications for media download, payment application for stores and/or transportation, store coupons, and etc., for example. The UI library 717 may include user interfaces available in various forms, including Java, Qt, native application, web runtime (WRT) widgets, and etc. One example of the UI library a version of Qt, developed by Nokia, that is used to develop graphical user interface programs. These applications and the user interfaces may be used to request content and perform transfer of data. The user interface may also show the status of the transfer of data, and roles of the UE 101.

The digital wallet 703 may include the role management component 723, the certified storage 725 and the general storage 727. The role management component 723 communicates with the embedded tag (eTag) 707 to determine the roles (e.g. read only, write only, read write, read write execute) and the activities related to the roles. The certified storage 725 includes secure information such as information regarding credit card, debit card, prepaid value, and transportation ticket (e.g. a bus pass) and other tickets. The general storage 727 may include secure information that does not require a security level as high as the certified storage. Thus, for example, the general storage 727 may include e-mails, short message service (SMS) data, contacts, bookmarks and etc. Further, although not shown, the UE 101 may also have an untrusted storage to store unsecure information. The wallet 703 may communicate with the tag server 705 and other memory units to read/write data. The tag server 705 communicates with a memory tag such as the etag 707, to enable communication between the memory tag of the UE 101 and another memory tag according to the roles, which depend on the devices involved in communication and the direction of the communication. The eTag 707 may have set memory allocations 711. The Tag MAC & PHY 709 may be used to convert between the digital data and an analog signal, such that the data may be transferred from or to the etag 707. The communication using the etag 707 may involve contactless wireless communication, and thus may be performed via the contactless interface 733. The Universal Integrated Circuit Card (UICC) 735 and other hardware (HW) security 737 may be implemented to ensure security in the personal data of the UE 101, which are managed by the common secure-element interface 729. Further, the data transferred to the eTag 707 via the tag server 705 may be written in other storage locations such as the USD (universal storage device) memory 39 and the Universal Flash Storage 731. The MTM memory 743 may also be utilized in this system. Further, Base Band 5 (BBS, by Nokia) 745 may be implemented to lock or unlock the UE 101. The UE 101 may also include an on-board credentials (ObC) 747 to verify any authentication information provided to the UE 101.

Figure 8:
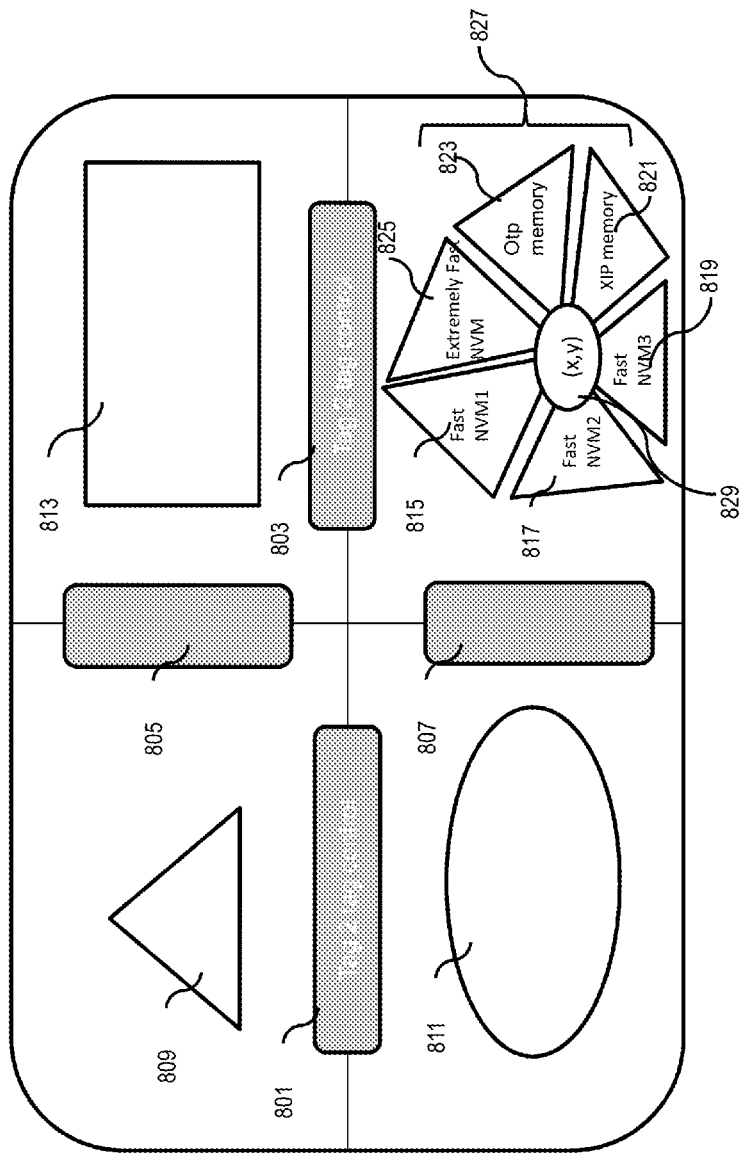
FIG. 8 is a diagram of a memory component with a tag-to-tag control and memory components, according to one embodiment.

FIG. 8 is a diagram of a memory component with a tag-to-tag control and memory components, according to one embodiment. The memory component 800 has tag-to-tag controls 801, 803, 805 and 807 to control communication and transfer of data between tags. Different types of memory tags 809, 811 and 813 may be present in the memory component 800 to provide different functions. The memory tags 809, 811 and 813 may be virtual or physical memory tags. The multi-directional memory unit 827 includes various memory units extending in various directions, wherein the memory unit 827 includes a fast non-volatile memory (NVM) 1 815, a fast NVM 2 817, a fast NVM 3 819, Execute in Place (XIP) memory 821, one-time programmable (OTP) memory 823 and an extremely fast NVM 825. With a directional antenna, the powering field direction for powering a passive memory tag may be sensed and the access policy (e.g. read only, write only, read write, read write execute, etc) may be determined based on the powering field direction and the communication direction with respect to the passive memory tag. In one example, extremely high frequency bands such as 60 GHz may be used with the directional antenna to provide direction-specific communication. With an omni directional antenna, a coordinate information (e.g. x-y for two-dimensional or x-y-z for three-dimensional direction) for the powering field may be used in determining the access policy. Thus, for the multi-directional memory unit 827, each of the memory units including the fast NVM 1 815, the fast NVM 2 817, the fast NVM 3 819, the Execute in Place (XIP) memory 821, the OTP memory 823 and the extremely fast NVM 825 may allow different access policy depending on its respective coordinate information in a x-y direction for 2D or a x-y-z direction for 3D. For example, the fast NVM 1 815 may allow RWX only if the powering field is in a 3-2 direction for the x-y direction.

FIGS. 9A-9B are diagrams of user interfaces utilized in the processes of FIGS. 4 and 5, according to one embodiment involving the UE 101. FIG. 9A shows a user interface 900 of the UE 101 showing available content that the UE 101 can acquire by connecting to a data source. The title 901 shows "available content," as the user interface is for selecting a device from a list of available content 903. In this example, the list 903 shows that there are three available contents: media, content from store device and content from the doctor's device. In this example, the media content is selected, as highlighted 905. Further, the visual representations of the devices containing the content are shown in the user interface 900. The visual representation for the media 907 is larger than the visual representation for the store device 909 or the visual representation for the doctor's device 911, because the device containing the media is in the nearest proximity to the UE 101. The "communicate" button 913 may be selected to start communication to acquire the selected content. The "More Info" button 915 may be selected to show additional information about the highlighted content. The Option 917 may be selected to display any other options that a user may choose on the UE 101. The Back button 919 may be selected to go back to a previous user interface or a previous screen.

FIG. 9B shows a user interface 930 of the UE 101 showing selections of content to request. The title 931 shows "select content," in order to show that the user interface is for selecting content to acquire at the UE 101. In this example, there are three different contents to request, movie A 933, audio B 935, and picture C 937, and the audio B 935 is highlighted for selection. The "request" button 939 may be selected to request the highlighted content, which is the audio B 931 selection, in this example. More information about the highlighted content may be displayed if the "More Info" button 941 is selected. The Option 943 and the Back button 945 have similar functionalities as the Option 917 and the Back button 919.

Figure 10B:
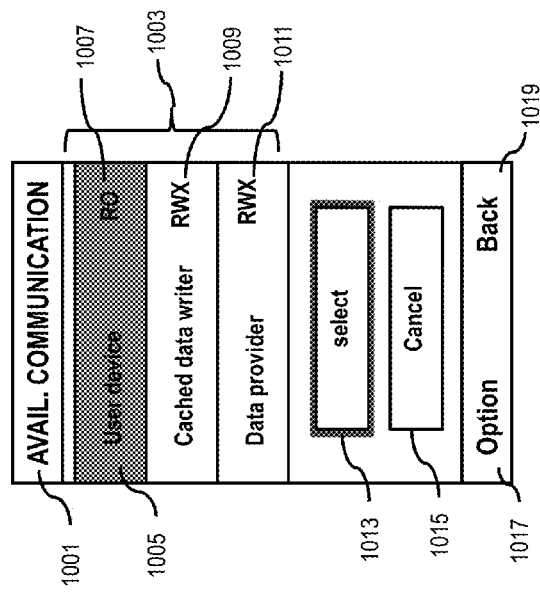
FIGS. 10A-10B are diagrams of user interfaces utilized in the processes of FIGS. 4 and 5 with respect to an end device, according to one embodiment.
Figure 10A:
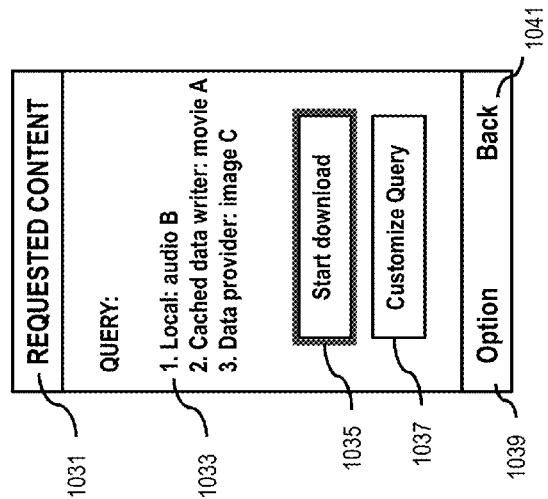

FIGS. 10A-10B are diagrams of user interfaces utilized in the processes of FIGS. 4 and 5, according to one embodiment involving the end device 111. FIG. 10A shows a user interface 1000 of the UE 101 showing available communication that the UE 101 can perform with other devices. The title 1001 shows "avail. communication," as the user interface is for selecting a device to communicate from a list of available devices for communication 1003. In this example, the list 1003 shows that there are three available communications: communication with a user device, a cashed data writer and a data provider. In this example, the communication with the user device is selected, as highlighted 1005. Further, the access policy for each available communication is shown in the user interface 900. The access policy for communicating with the user device is a read only (RO) operation 1007. Further, the access policies for the cached data writer and the data provider are read write execute, shown as RWX for the cached data writer 1009 and RWX for the data provider 1011. The "select" button 1013 may be selected to start communication with the selected device. The "cancel" button 1015 may be selected to cancel communication. The Option 1017 may be selected to display any other options that a user may choose at the end device 111. The Back button 1019 may be selected to go back to a previous user interface or a previous screen.

FIG. 10B shows a user interface 1030 of the end device 111 showing a query for acquisition of the requested content. The title 931 shows "requested content," in order to show that the user interface is for showing a requested content in a query. In this example, three different content data are to be downloaded, movie A located in the cached data writer, audio B located locally and image C located in the data provider. Because the priority level is high for the locally located data, medium for the data located in the cached data writer, and low for the data located in the data provider, the query 1033 shows that audio B, movie A and image C are to be downloaded in this priority order. The "start download" button 1035 may be selected to download the content according to the query 1033. The query may also be customized to manually change the order of the download by selecting the "customize query" button 1037. The Option 1039 and the Back button 1041 have similar functionalities as the Option 1017 and the Back button 1019.

The processes described herein for performing a multi-role communication using a RF memory tag may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
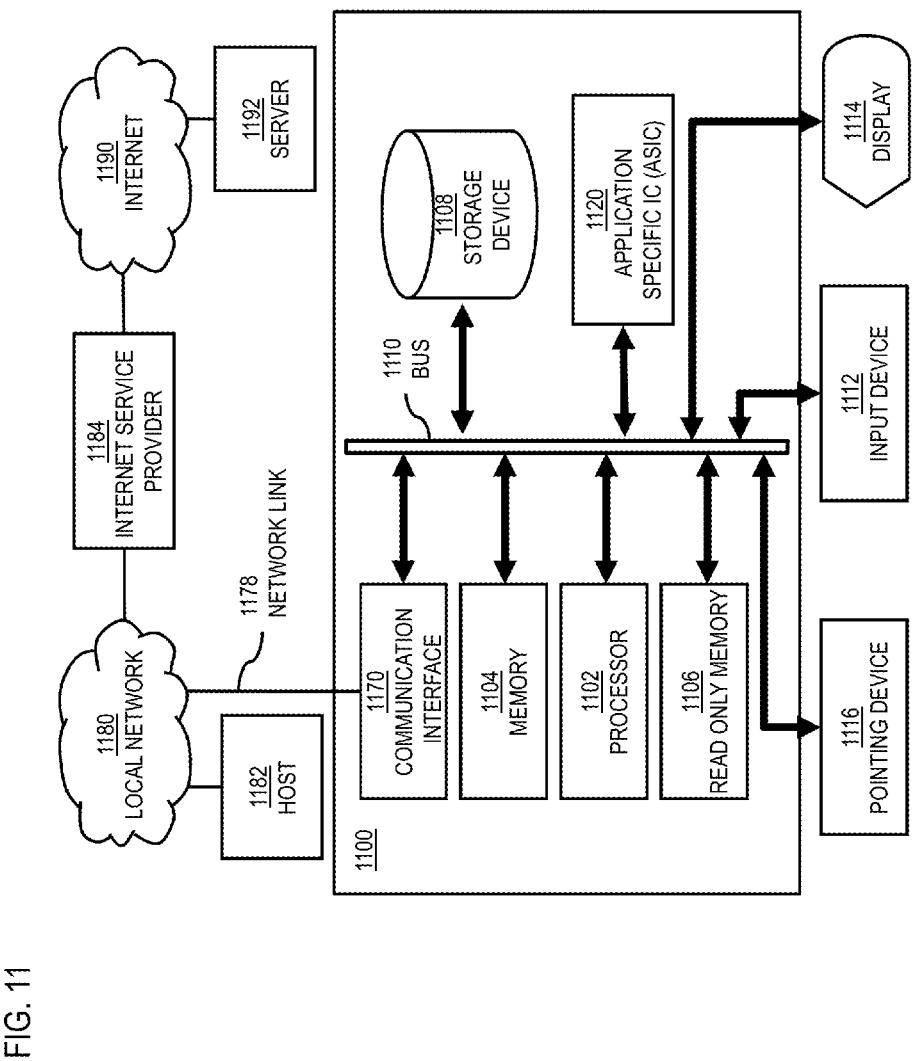
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to perform a multi-role communication using a RF memory tag as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of performing a multi-role communication using a RF memory tag.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to performing a multi-role communication using a RF memory tag. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for performing a multi-role communication using a RF memory tag. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for performing a multi-role communication using a RF memory tag, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for performing a multi-role communication using a RF memory tag.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to perform a multi-role communication using a RF memory tag as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of services. Chip set or chip 1200, or a portion thereof, constitutes a means for performing one or more steps of performing a multi-role communication using a RF memory tag.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to perform a multi-role communication using a RF memory tag. The memory 1205 also stores the data associated with or generated by the execution of the inventive steps.

Figure 13:
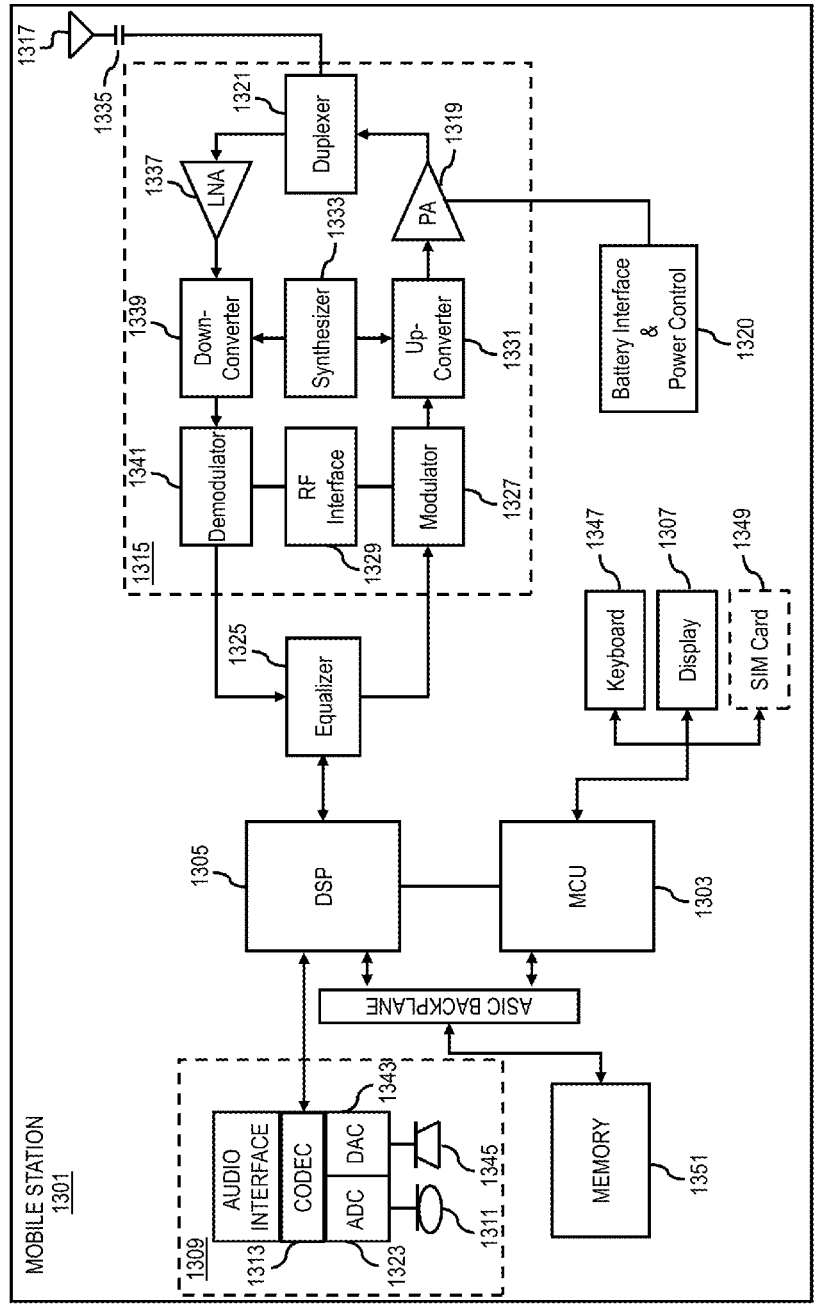
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1300, or a portion thereof, constitutes a means for performing one or more steps of performing a multi-role communication using a RF memory tag. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of performing a multi-role communication using a RF memory tag. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to perform a multi-role communication using a RF memory tag. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Figure 14:
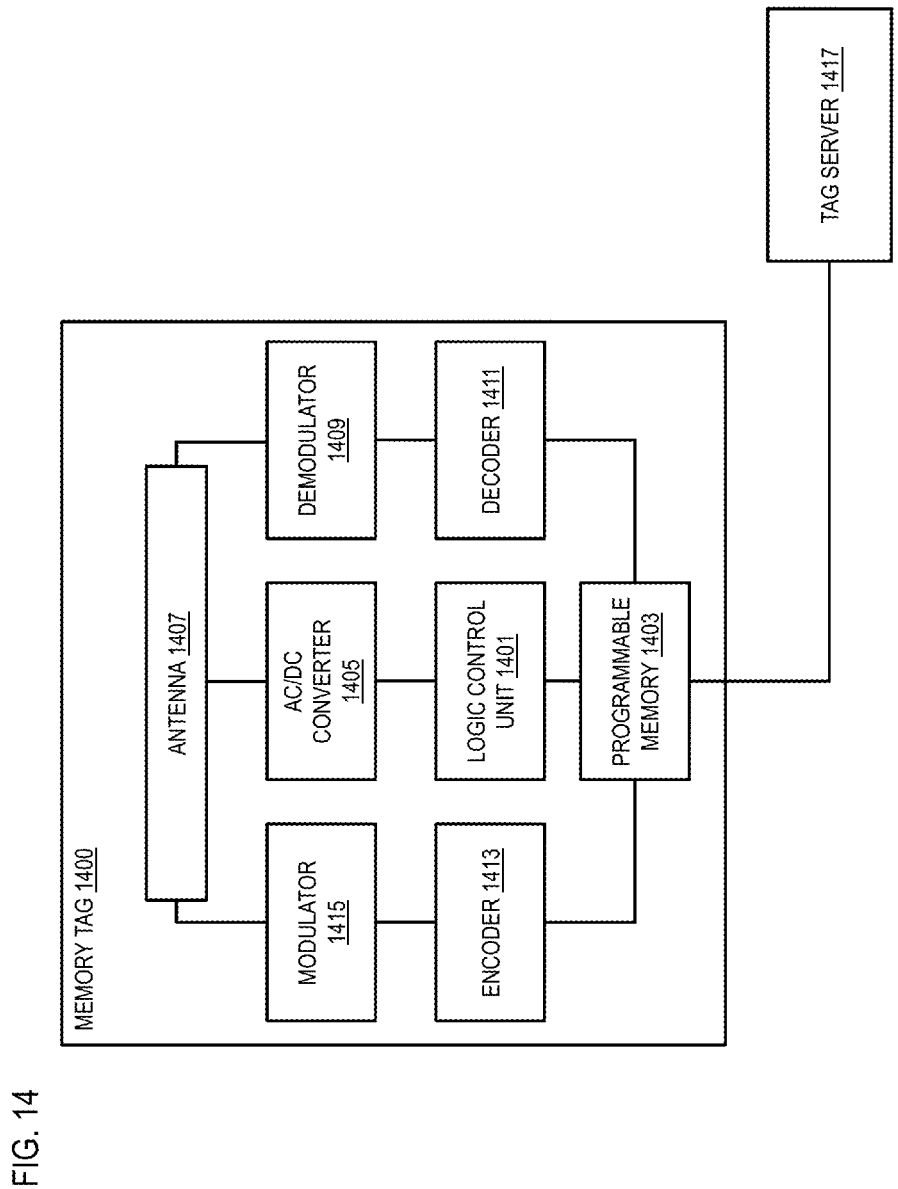
FIG. 14 depicts exemplary components of an RF memory tag, according to one embodiment.

FIG. 14 depicts exemplary components of an RF memory tag, according to one embodiment. As shown, the memory tag 1400 may be used as the UE memory tag 109, the end memory tag 117, the writer memory tag 125, the data memory tag 131, etc. It is contemplated that the functions of these components may be combined in one or more components of performed by other components of equivalent functionality. As shown, a memory tag 1400 includes a logic control unit 1401 to control the functions of the transmitter (e.g., receive a query from a memory tag reader and transmit a signal in response to the query). The logic control unit 1401 has connectivity to a programmable memory 1403 for storing information that is to be transmitted to the memory tag reader. In one embodiment, the programmable memory 1403 is an electrically erasable programmable read-only memory (EEPROM), or other non-volatile memory (NVM), such as a phase change memory (PCM). In one embodiment, an external device (not shown) has connectivity to the memory tag 1400 for dynamically programming the programmable memory 1403. The information can then be provided as a signal to trigger a specific action when the memory tag is read. In the case of an active RF memory tag, the logic control unit 1401 also has connectivity to an AC/DC converter 1405 to in part provide electrical power to erase and reprogram the programmable memory 1403. In the case of a passive RF memory tag, the AC/DC converter 1405 may not be present because the powering of the RF memory tag may be provided by a reader/writer device for the passive RF memory tag.

The memory tag 1400 includes an antenna(s) 1407 for power and data radios, for receiving power field from active device (e.g. reader/writer, or another active device providing only power) and/or transmitting and receiving data radio signals accordingly. When receiving a signal (e.g., a query from the memory reader), the antenna 1407 passes the received radio signal to a demodulator 1409 to extract information from the radio signal (e.g., carrier wave). The information is then forwarded to a decoder 1411 to decode the information for processing by the logic control unit 1401. To transmit information, the logic control unit 1401 retrieves the information from the programmable memory 1403 and forwards it to an encoder 1413. The encoder 1413 then passes the encoded information to a modulator 1415 for convert the information to a radio signal for transmission over the antenna 1407. The antenna 1407 may also be used to achieve short range connectivity such as Ultra High Frequency/Near Field Communication (UHF/NFC) and/or Impulse based Ultra Wideband (I-UWB). The antenna 1407 may also include two or more antennas and/or adjustable/movable antenna(s). The short range wave (e.g. UHF/NFC) received by the antenna 1407 may also be used to power the memory tag 1400, if the memory tag 1400 is a passive memory tag, and e.g. two directional I-UWB is used for high speed data access. The memory tag 1400 is also connected to the tag server 1417 that manages the communication between the memory tag 1400 with other devices. Such tag server may reside at the reader/writer device side.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  receiving a content request, at a memory tag, from a first device;
  determining one or more sources of content data responsive to the content request according to a first access policy; and
  determining to provide access from the one or more sources to the memory tag according to a second access policy,
  wherein the access facilitates transmission of the content data to the first device according to a third access policy, and
  wherein the first access policy, the second access policy, and the third access policy specify, at least in part, accessibility and rights with respect to read operations, write operations, execute operations, or a combination thereof among the first device, the memory tag, and the one or more sources based, at least in part, on respective roles associated with the first device, the memory tag, the one or more sources, or a combination thereof.

2. A method of claim 1, further comprising:
  determining to establish one or more data channels between the first device and the one or more sources; and
  determining to transmit the content data from the one or more sources to the first device according to the third access policy.

3. A method of claim 1, further comprising:
  determining a priority order of the one or more sources,
  wherein the transmission of the content data is based, at least in part, on the priority order.

4. A method of claim 1, further comprising:
  determining a respective powering field direction of the first device, the one or more sources, or a combination thereof with respect to the memory tag,
  wherein the first access policy, the second access policy, the third access policy, or a combination thereof are based, at least in part, on the respective powering field direction.

5. A method of claim 4, further comprising:
  assigning respective roles to the first device, the one or more sources, or a combination thereof based, at least in part, on the respective powering field direction.

6. A method of claim 1, wherein the one or more sources include a cache in the first device, a cache in the memory tag, a cache in a second device, storage associated with one or more content providers, or a combination thereof.

7. A method of claim 1, further comprising:
  determining to present a user interface representing the first device, the memory tag, the one or more sources, the content data, or a combination thereof.

8. A method of claim 7, further comprising:
  determining a respective proximity of the first device, the memory tag, the one or more sources, the content data, or a combination thereof,
  wherein the presentation of the user interface is based, at least in part, on the respective proximity.

9. A method of claim 7, wherein the user interface includes visual representations, audio representations, tactile representations, or a combination thereof.

10. A method of claim 1, further comprising:
determining to decompose the content request to one or more queries;
determining to distribute the one or more queries among the one or more sources; and
determining to aggregate the content data from the one or more sources based, at least in part, on the one or more queries.

11. A method of claim 1, wherein the memory tag is a Radio Frequency (RF) memory tag.

12. An apparatus comprising:
at least one processor; and
at least one memory including computer program code for one or more programs,
the at least one memory and the computer program code configured to, with the at least one processor, cause the apparatus to perform at least the following:
receive a content request, at a memory tag, from a first device;
determine one or more sources of content data responsive to the content request according to a first access policy; and
determine to provide access from the one or more sources to the memory tag according to a second access policy,
wherein the access facilitates transmission of the content data to the first device according to a third access policy, and
wherein the first access policy, the second access policy, and the third access policy specify, at least in part, accessibility and rights with respect to read operations, write operations, execute operations, or a combination thereof among the first device, the memory tag, and the one or more sources based, at least in part, on respective roles associated with the first device, the memory tag, the one or more sources, or a combination thereof.

13. An apparatus of claim 12, wherein the apparatus is further caused to:
determine to establish one or more data channels between the first device and the one or more sources; and
determine to transmit the content data from the one or more sources to the first device according to the third access policy.

14. An apparatus of claim 12, wherein the apparatus is further caused to:
determine a respective powering field direction of the first device, the one or more sources, or a combination thereof with respect to the memory tag,
wherein the first access policy, the second access policy, the third access policy, or a combination thereof are based, at least in part, on the respective powering field direction.

15. An apparatus of claim 12, wherein the one or more sources include a cache in the first device, a cache in the memory tag, a cache in a second device, storage associated with one or more content providers, or a combination thereof.

16. An apparatus of claim 12, wherein the apparatus is further caused to:
determine to present a user interface representing the first device, the memory tag, the one or more sources, the content data, or a combination thereof.

17. An apparatus of claim 16, wherein the apparatus is further caused to:
determine a respective proximity of the first device, the memory tag, the one or more sources, the content data, or a combination thereof,
wherein the presentation of the user interface is based, at least in part, on the respective proximity.

18. An apparatus of claim 12, wherein the apparatus is further caused to:
determine to decompose the content request to one or more queries;
determine to distribute the one or more queries among the one or more sources; and
determine to aggregate the content data from the one or more sources based, at least in part, on the one or more queries.

19. A method comprising:
receiving a content request, at a memory tag, from a first device;
determining one or more sources of content data responsive to the content request according to a first access policy;
determining to provide access from the one or more sources to the memory tag according to a second access policy, wherein the access facilitates transmission of the content data to the first device according to a third access policy;
determining a respective powering field direction of the first device, the one or more sources, or a combination thereof with respect to the memory tag; and
determining to assign respective roles to the first device, the one or more sources, or a combination thereof based, at least in part, on the respective powering field direction, wherein the first access policy, the second access policy, the third access policy, or a combination thereof are based, at least in part, on the respective powering field direction.

20. A method comprising:
receiving a content request, at a memory tag, from a first device;
determining one or more sources of content data responsive to the content request according to a first access policy;
determining to provide access from the one or more sources to the memory tag according to a second access policy, wherein the access facilitates transmission of the content data to the first device according to a third access policy;
determining a respective proximity of the first device, the memory tag, the one or more sources, the content data, or a combination thereof; and
determining to present a user interface representing the first device, the memory tag, the one or more sources, the content data, or a combination thereof based, at least in part, on the respective proximity.

21. A method comprising:
receiving a content request, at a memory tag, from a first device;
determining one or more sources of content data responsive to the content request according to a first access policy;
determining to provide access from the one or more sources to the memory tag according to a second access policy, wherein the access facilitates transmission of the content data to the first device according to a third access policy;
determining to decompose the content request to one or more queries;
determining to distribute the one or more queries among the one or more sources; and
determining to aggregate the content data from the one or more sources based, at least in part, on the one or more queries.

* * * * *